June 11, 1935.  E. L. YANCHUS  2,004,885
ROTAPLANE
Filed March 6, 1933
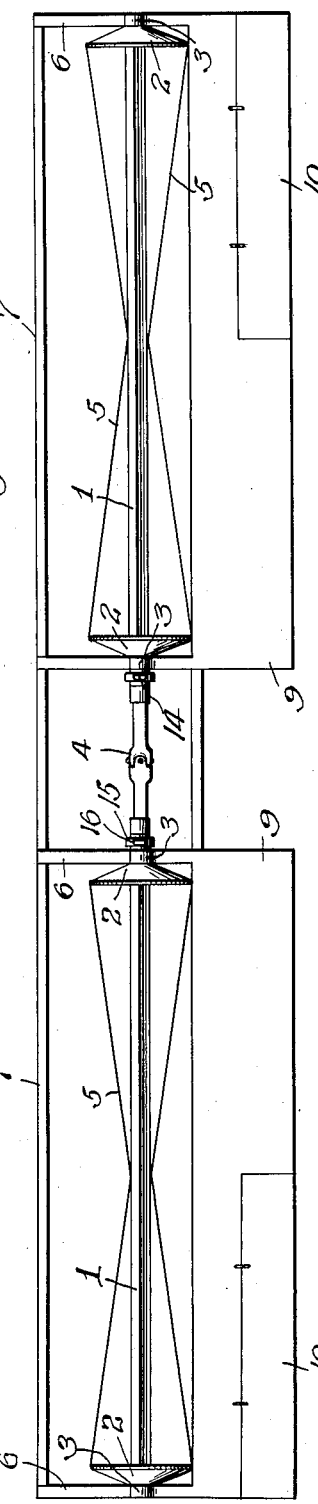
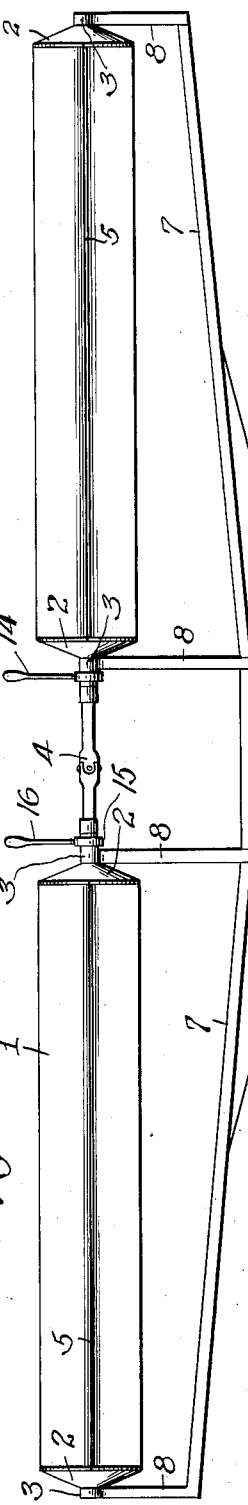
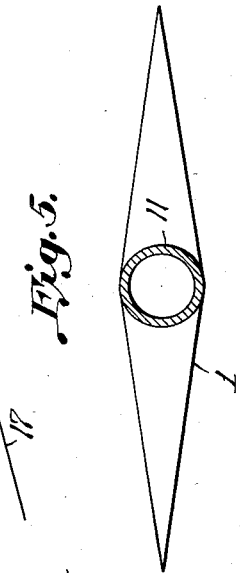
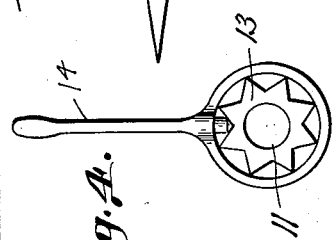
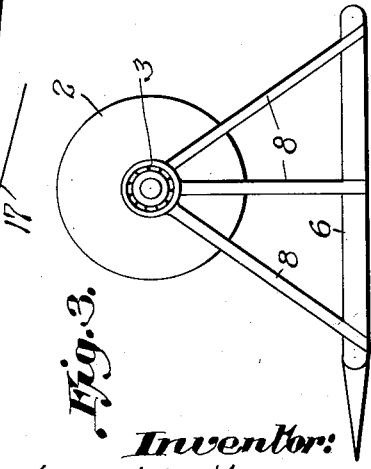
Inventor:
Edward L. Yanchus Patented June 11, 1935

2,004,885

UNITED STATES PATENT OFFICE 2,004,885

ROTAPLANE

Edward L. Yanchus, Masontown, Pa., assignor of one-half to Isidore Rothstein

Application March 6, 1933, Serial No. 659,862

10 Claims. (Cl. 244—14)

My invention is an aircraft, consisting of a conventional aeroplane fuselage, with laterally extending rotative planes, supported by a fixed frame.

It takes off, flies, and lands in much the same manner as an aeroplane. Its principle of operation, however, is entirely different.

The operating principle of a rotating plane is similar to that of a cylindrical rotor. Both deflect the relative wind upwards, creating a high pressure area at the lower surface, and a low pressure area at the upper surface. There are two points of differentiation, however:

1. A cylindrical rotor exerts a dragging action, whereas a rotating plane exerts a push and pull action on the relative wind.

2. A cylindrical rotor must be powered, whereas a rotating plane turns automatically in a relative wind. I believe that this automatic rotation is the result of a burbling action, induced by the rotation itself, and occurring below the axis of rotation. Due to the resulting difference in pressure above and below the axis, a rotative force is generated.

The rotating plane design herein disclosed is based on the above theory. I believe it to be the most efficient application of the principles described.

In the drawing:

Fig. 1 is a top view of my invention.

Fig. 2 is a front view.

Fig. 3 is an end view of the device.

Fig. 4 is a cross-section view of the starting lever.

Fig. 5 is a cross-section view of the rotating planes.

Referring first to Fig. 5, the rotating planes 1 are substantially diamond shaped in cross-section. An axle 11 passes through the center of each plane.

Referring to Fig. 4, the planes are given an initial spin by the starting lever 14, connected to the right axle 11 by means of a free-wheel ratchet 13.

Referring to Figs. 1, 2 and 3, the rotating planes 1 are connected by a universal joint 4, and turn in bearings 3, held by the bearing posts 8, which in turn are attached to the supporting frame consisting of the cross members 6 and the longitudinal members 7. This supporting frame is attached transversely to the fuselage of the craft. The lift wires 17 give added strength.

The fixed planes 9 are secured to the rear longitudinal members 7 of the frame. The ailerons 10 are in turn hinged to the fixed planes.

The tip discs 2 are attached to the ends of the rotating planes 1. Additional strength is secured by the cantilever wire bracing 5.

A brake lever 16 with shoes 15, acts on the left axle 11, providing braking action when desired.

I claim as my invention:

1. In an aircraft having a fuselage and propelling means, a lifting device including an element rotating on an axis transverse of said fuselage, said element consisting of a plane substantially diamond shaped in cross section, said axis passing thru said plane longitudinally thereof in the region of the thickest part of the plane.

2. In an aircraft having a fuselage and propelling means, a lifting device including an element rotating on an axis transverse of said fuselage, said element consisting of a plane substantially diamond shaped in cross section with the two points thereof adjacent the center rounded, said axis passing thru said plane longitudinally thereof in the region of the thickest part of the plane.

3. In an aircraft having a fuselage and propelling means, a frame secured to said fuselage, a lifting device mounted on said frame and including an element rotating on an axis transverse of said fuselage, said element consisting of a plane substantially diamond shaped in cross section with the two points thereof adjacent the center rounded, said axis passing thru said plane longitudinally thereof in the region of the thickest part of the plane.

4. In an aircraft having a fuselage and propelling means, a frame secured to said fuselage, a lifting device mounted on said frame and including an element rotating on an axis transverse of said fuselage, said element consisting of a plane substantially diamond-shaped in cross section, said axis passing through said plane longitudinally thereof in the region of the thickest part of the plane.

5. In an aircraft having a fuselage and propelling means, a lifting device including an element rotating on an axis transverse of said fuselage, said element consisting of a plane substantially diamond-shaped in cross section, said axis passing through said plane longitudinally thereof in the region of the thickest part of the plane and laterally extending wings secured to said fuselage, adjacent said lifting device.

6. In an aircraft having a fuselage and propelling means, a lifting device including an element rotating on an axis transverse of said fuselage, said element consisting of a plane substantially diamond-shaped in cross section with the two points thereof adjacent the center rounded, said axis passing through said plane longitudinally thereof in the region of the thickest part of the plane, and laterally extending wings secured to said fuselage, adjacent said lifting device.

7. In an aircraft having a fuselage and propelling means, a lifting device including an element rotating on an axis transverse of said fuselage, said element consisting of a plane substantially diamond-shaped in cross section, said axis passing through said plane longitudinally thereof in the region of the thickest part of the plane, and laterally extending wings secured to said fuselage, adjacent said lifting device and to the rear thereof.

8. In an aircraft having a fuselage and propelling means, a lifting device including an element rotating on an axis transverse of said fuselage, said element consisting of a plane substantially diamond-shaped in cross section, said axis passing through said plane longitudinally thereof in the region of the thickest part of the plane, and laterally extending wings secured to said fuselage, adjacent said lifting device and to the rear and below the level of said lifting device.

9. In an aircraft having a fuselage and propelling means, a lifting device including an element rotating on an axis transverse of said fuselage, said element consisting of a plane substantially diamond-shaped in cross section with the two points thereof adjacent the center rounded, said axis passing through said plane longitudinally thereof in the region of the thickest part of the plane, and laterally extending wings secured to said fuselage, adjacent said lifting device and to the rear thereof.

10. In an aircraft having a fuselage and propelling means, a lifting device including an element rotating on an axis transverse of said fuselage, said element consisting of a plane substantially diamond-shaped in cross section with the two points thereof adjacent the center rounded, said axis passing through said plane longitudinally thereof in the region of the thickest part of the plane, and laterally extending wings secured to said fuselage, adjacent said lifting device and to the rear and below the level of said lifting device.

EDWARD L. YANCHUS.